United States Patent [19]

Kudo

[11] Patent Number: 5,440,681
[45] Date of Patent: Aug. 8, 1995

[54] METHOD AND APPARATUS FOR DISPLAY AND INTERACTIVE MODIFICATION OF THE TASKS IN A PRODUCTION PLAN

[75] Inventor: Michiharu Kudo, Tokyo, Japan

[73] Assignee: International Business Machines Corporation, Armonk, N.Y.

[21] Appl. No.: 185,721

[22] Filed: Jan. 24, 1994

Related U.S. Application Data

[63] Continuation of Ser. No. 733,045, Jul. 19, 1991, abandoned.

[51] Int. Cl.$^6$ ............................................. G06F 3/00
[52] U.S. Cl. ........................... 395/161; 395/140; 364/401; 364/402
[58] Field of Search ................ 395/155–161, 395/140, 139; 340/700; 345/117–120, 131; 364/401–402

[56] References Cited

U.S. PATENT DOCUMENTS

| | | | |
|---|---|---|---|
| 3,703,630 | 11/1972 | Gelder | 364/401 |
| 3,725,650 | 4/1973 | Gelder | 364/402 X |
| 4,674,043 | 6/1987 | Hernandez et al. | 364/401 |
| 4,847,785 | 7/1989 | Stephens | 340/722 |
| 4,852,001 | 7/1989 | Tsushima et al. | 364/401 |
| 5,016,170 | 5/1991 | Pollalis et al. | 364/401 |

FOREIGN PATENT DOCUMENTS

| | | | |
|---|---|---|---|
| 58-64563 | 4/1983 | Japan | G06F 15/20 |
| 61-229164 | 10/1986 | Japan | G06F 15/62 |
| 62-224561 | 10/1987 | Japan | G06F 15/20 |
| 6222456 | 3/1988 | Japan | G06F 15/20 |
| 0273458 | 3/1990 | Japan | G06F 15/22 |

OTHER PUBLICATIONS

Fersko-Weiss, "Low-Cost Project Management", PC Mag., Sep. 11, 1990, p. 331 (16).
Fersko-Weiss, "InstaPlan 5000", P.C. Mag., Sep. 11, 1990, p. 342 (3).
Microsoft Works User's Guide, Microsoft Corp., 1989, pp. 103–143.

*Primary Examiner*—Mark R. Powell
*Assistant Examiner*—John E. Breene
*Attorney, Agent, or Firm*—Lauren C. Bruzzone; Kenneth A. Seaman

[57] ABSTRACT

A method and apparatus for the interactive modification of a production schedule using a graphical user interface. Each production task is represented by one or more primitive tasks. A primitive task is defined as that part of a production task for which the production amount or load remains unchanged. The primitive tasks are shown graphically on a display device as rectangular objects and are assigned attributes that are used to establish modification rules governing the way in which the graphical shapes change in response to the user's manipulation of the rectangular object representing one primitive task. A user can manipulate any primitive task through the graphical interface, and thereby modify the shapes of other primitive tasks which belong to the same production task in accordance with the modification rules. After manipulation of one or more primitive tasks, a graphical representation of a production schedule for a plurality of tasks is displayed which can be further optimized to achieve production load balancing.

15 Claims, 13 Drawing Sheets

| UNIT | ATTRIBUTE | ATTRIBUTE VALUE | | |
|---|---|---|---|---|
| PRIMITIVE TASK | CONTROL ATTRIBUTE | CONTROL | DEPENDENCY | INDEPENDENCY |
| | DIRECTION ATTRIBUTE | LONGITUDINAL | TRANSVERSE | |
| | WEIGHT ATTRIBUTE | NUMERICAL VALUE | | |
| | DATE ATTRIBUTE | START | END | |
| | PERIO ATTRIBUTE | START | END | |
| TASK | DISTRIBUTION ATTRIBUTE | INTERNAL DIVISION | PROPORTION | |
| | BASIS ATTRIBUTE | PERIOD | LOAD | AREA |
| | INVERSION ATTRIBUTE | INVERSION | SAME VALUE | AREA CONSTANT |
| | | PEPIOD | LOAD | AREA |
| | TARGET ATTRIBUTE | AREA/PERIOD | | AREA/LOAD |

FIG. 17

TASK ATTRIBUTE SETING

DISTRIBUTION ATTRIBUTE   INVERSION ATTRIBUTE

- ● INTERNAL DIVISION    ● INVERSION
- ○ PROPORTION           ○ SAME VALUE

BASIS ATTRIBUTE          TARGET ATTRIBUTE
- ● PERIOD               ○ PERIOD
- ○ LOAD                 ○ LOAD
- ○ AREA                 ● AREA
- ○ CONSTANT             ○ AREA/PERIOD
                         ○ AREA/LOAD

ENTER    CANCEL    HELP

FIG. 18

METHOD AND APPARATUS FOR DISPLAY AND INTERACTIVE MODIFICATION OF THE TASKS IN A PRODUCTION PLAN

This application is a continuation of U.S. Ser. No. 07/733,045 filed Jul. 19, 1991, to M. Kudo, entitled "METHOD AND APPARATUS FOR DISPLAY AND INTERACTIVE MODIFICATION OF THE TASKS IN A PRODUCTION PLAN", now abandoned, assigned to the same assignee as this patent application.

BACKGROUND OF THE INVENTION

A. Field of the Invention

This invention relates to a method and an apparatus for modifying a production plan and, more particularly, to a method and apparatus for interactive modification of a production plan to achieve load balancing using a graphical user interface.

B. Prior Art

Conventional production plan modification techniques such as flat distribution or load-balancing are often expressed in the form of a spread sheet. When expressing a production plan in the form of a spread sheet, in general, different kinds of products are placed on the ordinate of a table while the time base is placed on the abscissa, so that the respective production quantities (numerical value data) of products to be produced in a unit period (month, week, day or hour) are sequentially entered in different cells. In order to modify the production plan, a user either manually rewrites such respective cell values when desired, or the cell is automatically rewritten by a recalculation mechanism of the spread sheet program. The production plan modification method using a spread sheet program involves the problems set out below.

1). Complicated manual calculation by the user is required.

When the user modifies a part of the production plan while maintaining a constant production quantity of a predetermined product, he must calculate manually the production amount required in addition to the automatic calculation by the recalculation mechanism of the spread sheet program.

2). The entire pattern is not readily comprehensive.

It is difficult to confirm the overall changes and the entire pattern of the production plan, with only the enumeration of numeral values provided by the spread sheet program.

There is also a more primitive method in which a load-accumulation graph is depicted on paper, without using a spread sheet program. The load-accumulation graph is used when displaying the total production load of a plurality of products as a single representation. There is no conventional method of modifying a production plan on a load-accumulation graph. It is always necessary to rewrite at least a part of the graph.

The following references are related to the present invention.

JPUPA (Japanese Published Unexamined Patent Application) No. 61-229164 discloses direct manipulation using a screen display to modify original data on a business chart. The publication, however, does not suggest any specific model to display the production plan.

JPUPA No. 2-73458 discloses a method for executing the recalculation of a spread sheet in a required direction. The publication, however, does not teach how to express the production plan.

JPUPA No. 58-64563 discloses interactive production planning, using a representation on a display device. In the publication, however, what is represented are the limiting conditions for the production plan; the production plan itself is not represented. This publication does not teach manipulation through the screen display for direct modification of a graphical representation of the production plan. Further, the publication does not teach the concept of primitive tasks to provide a constant work amount as will be described below.

JPUPA No. 62-224561 discloses the use of color distinction to distinguish the degrees of production load (work amount) of a production plan. In the publication, a production plan is shown by a matrix, with the work in rows and the time in columns, so that degrees of production load are color-displayed at respective positions of the matrix. The publication teaches neither the concept of direct modification of a graphical display of a production plan through interactive manipulation of the figure on the screen display, nor the concept of primitive tasks for providing a constant work amount.

SUMMARY OF THE INVENTION

It is, therefore, an object of the invention to provide a method and apparatus for the interactive modification of a production plan through a graphical user interface.

It is another object of this invention to provide a method for automatically redistributing tasks in a production plan to provide load balancing across multiple time periods.

In order to accomplish these and other objects and advantages, the invention represents a task in the form of a model arranged as a combination of primitive tasks whose work amount (production quantity, production load, production time) is kept unchanged for the duration of its time period, so that the primitive tasks represented are modified in an interactive and graphical manner under a set of constraints by altering the shapes and positions of the graphical figures representing the primitive tasks.

In another aspect of the invention, the sum of the area of a graphical figure of a modified primitive task and the areas of the graphical figures of the other primitive tasks included in a task to which the modified primitive task belongs is kept unchanged. This provides for the modification of the production plan while maintaining the work amount of the entire task constant.

In a further aspect of the invention, one or both of a primitive task and a task can be assigned attributes, the values of which are then used to establish a modification rule.

BRIEF DESCRIPTION OF THE DRAWINGS

FIG. 17 is a diagram showing an attribute data list;

FIG. 18 is a diagram showing an interactive attribute setting panel represented as a window display;

DETAILED DESCRIPTION OF THE PREFERRED EMBODIMENT

The preferred embodiment of the invention is described below, referring to the accompanying drawings.

A. Schema of the System

Figure 1A:
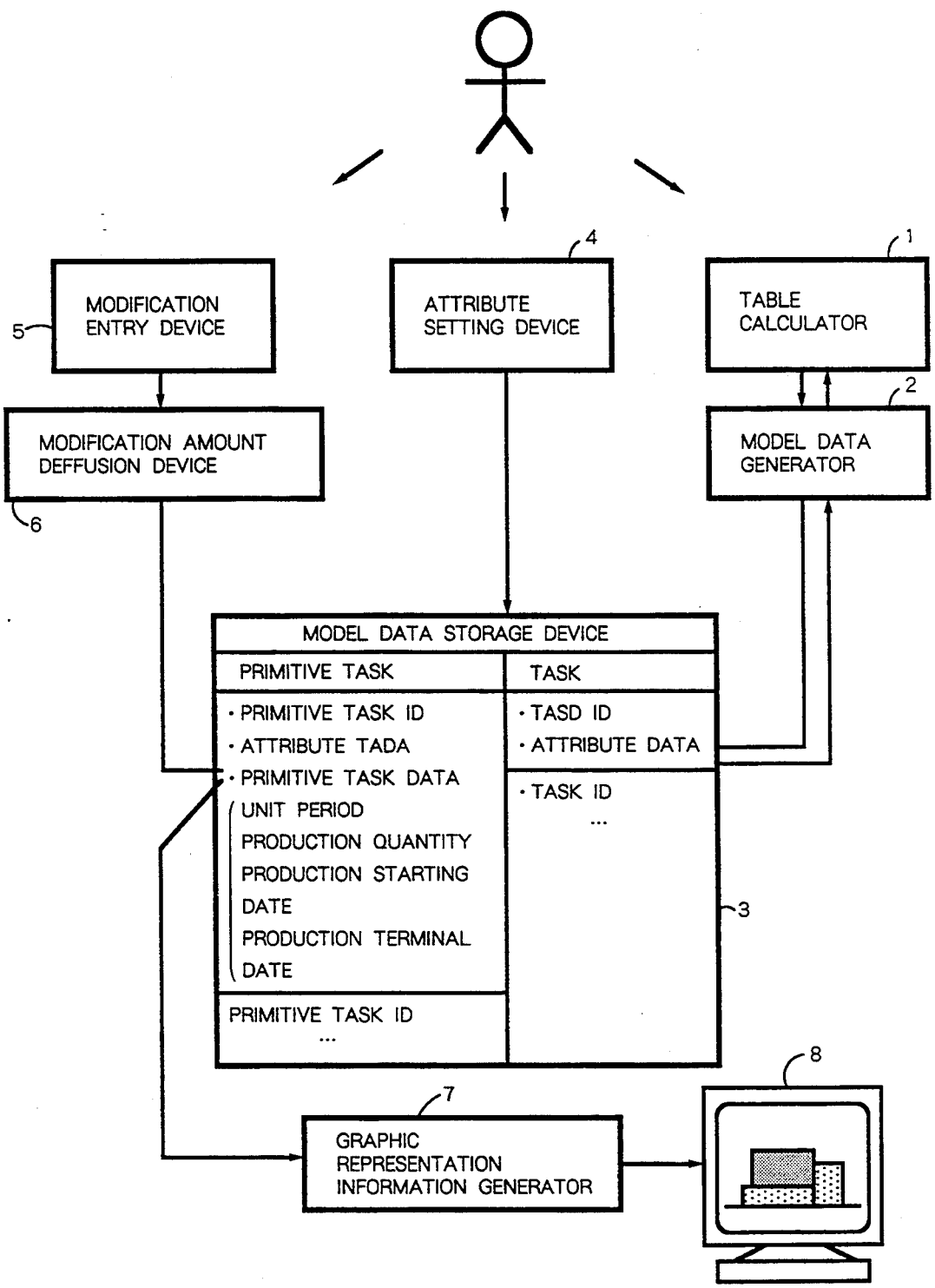
FIG. 1A is a block diagram showing the entire arrangement of the preferred embodiment of the invention.

FIG. 1A shows the preferred embodiment schematically. Although the invention may be realized in either software or hardware, the preferred embodiment is realized as a software product executable on a PS/2 (trademark) Model 55 personal computer running under an OS/2 (trademark) operating system both of which are available from IBM Corporation. The following description explains the software function depicted in the blocks shown in FIG. 1A.

In FIG. 1A, the production plan modifying apparatus according to the invention includes a table calculator 1, a model data generator 2, a model data storage device 3, an attribute setting device 4, a modification entry device 5, a modification diffusion device 6, a graphic representation information generator 7 and a display device 8.

The table calculator 1 can be a typical spread sheet program into which a work planner enters a production plan in a conventional manner. For example, putting the sorts of a plurality of products on the ordinate of the table and the time base on the abscissa, production quantities of respective products (numerical data) to be produced in a unit period (month, week, day or hour) are sequentially entered in different cells. The production plan entered with the table calculator 1 used by the model data generator 2 which, in turn, converts it into data defining a production plan model and stores the model data on model data storage device 3 (described below). The graphic representation information generator 7, receives the model data from the model data storage device 3, generates graphic representation data and supplies the graphic representation data to the display device 8. As a result, a graphic representation of the production plan is shown on the screen of the display device 8.

Modification of the production plan is executed by direct manipulation of the model data on the screen of the display device 8. Specifically, a plan modifier (who can be the work planner and is hereinafter called a user) first uses the attribute setting device 4 to set attribute switches in desired positions. The attribute switches will be referred to later in greater detail with reference to FIG. 1B. Selected combinations of values of the attribute switches determine restraints to be satisfied by respective primitive tasks and among respective primitive tasks. A primitive task (or task) selecting lever is operated to identify a target primitive task (or task), and a setting button below each attribute switch is pressed to set the value of the corresponding attribute. The status of the attribute switches thus established is recorded as attribute data of the primitive tasks (or tasks) within the model data storage device 3. Subsequently, when the user displaces the position of an edge of a graphic figure of the plan shown on the display device 8 through the modification entry device (e.g., mouse device) 5, the mouse operation and the attribute data and primitive task data (production quantity per unit period, production starting date, production terminal data) stored on the model data storage device 3 are read into the modification displacement amount diffusion device 6 for purposes of displacement calculation, distribution calculation, shape calculation and location calculation in an algorithm explained below. Based on the results of these calculations, primitive task data stored on mode]data storage device 3 is written in a modified form. The modified model data is sent to the graphical representation information generator 7, and a graphic representation of the modified production plan is shown on the display device 8. The modified model data is then inversely converted into production plan information by the model data generator 2 and supplied to the table calculator 1.

B. Production Plan Model

Figure 2:
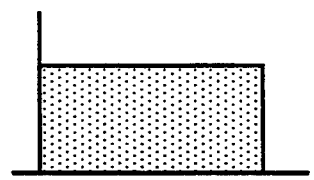
FIGS. 2 and 3 are diagrams that illustrate a primitive task and a task in a production plan model.
Figure 3:
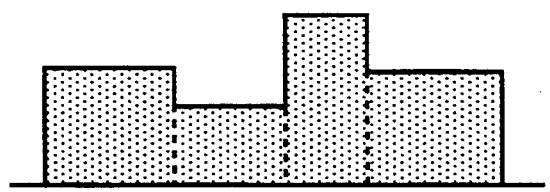
Figure 4:
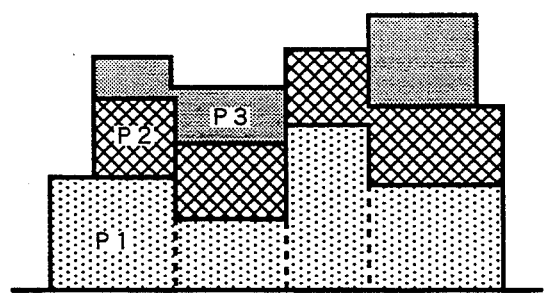
FIG. 4 is a diagram that illustrates an example of a graphical display of a production plan including three tasks.

In this embodiment, production plan data is stored as a production plan model in the model data storage device 3. The production plan model is comprised of primitive tasks, which are the basic component units of the plan, and tasks for binding the primitive tasks into a group. A primitive task is expressed in the form of a rectangle on the display device 8 as shown in FIG. 2. The primitive task is expressed, for each product or task, with a time period for continuing a predetermined (constant) production load or quantity being regarded as a component of the plan. The abscissa of the rectangle indicates time, while the ordinate shows the production quantity or work load. The production plan unit superior to the primitive tasks is simply referred to as a task. As shown in FIG. 3, a task can be expressed by a combination of one or more primitive tasks aligned in the time base direction. Typically, a product plan is expressed as a task, and a time period having a constant production load in the task is expressed as a primitive task. In particular, for simultaneous representation of a plurality of tasks, if the time periods of two or more tasks overlap, one of the tasks is shown as overlapping the other task or tasks in a manner that accumulates the production loads as shown in FIG. 4. As a result, the total production load of each overlapping time period is expressed by the position of the upper edge of the primitive task of the uppermost task. In FIG. 4, P1, P2 and P3 indicate different tasks corresponding to different products.

The production plan data stored in the model data storage device 3 is formed from data on the primitive tasks and data on the tasks. The primitive task data includes a primitive task ID for identifying each primitive task, and attribute data for describing the operational characteristics of the primitive task. Specifically, three values define the shape of the primitive task, i.e., the unit period production quantity (corresponding to the height of a rectangle), the production starting date (corresponding to the lower left vertex of the rectangle) and the production terminal date (corresponding to the lower right vertex of the rectangle). The task data includes a task ID for identifying each task, and attribute data for describing the operational characteristics of the task The attributes of both primitive tasks and tasks are referred to in greater detail in the following section Except for the attribute data, the production plan model can be readily constructed in the model data generator 2, based on the production plan expressed in the spread sheet by the table calculator 1 (obtained by expressing the production quantity of each product to be produced in a unit period as the contents of a cell and aligning the plans of a plurality of products in a time sequence as a table). More specifically, by deciding the points where the production quantity in a unit period is changed in the time sequence, the task may be divided into primitive tasks at such points.

The expression of the production plan model on the display device 8 is executed by the graphic representation information generator 7. More specifically, the graphic representation information generator 7 receives shape data for the primitive tasks, effects preliminary processing of the shape data for cumulative representation of tasks and, subsequently, calls a graphic representation interface function provided by a computer operating system to display the production plan graphically shown in FIG. 4. In FIG. 4, although the task P2 is shown as if it includes four primitive tasks, because of its always constant load, it is referred to as a single primitive task in the production control model according to the invention.

C. Attribute Data

Attribute data is used to establish a modification rule which determines how a primitive task and a task in the production plan model is modified interactively by manipulation of the screen display. The attribute data for primitive tasks includes control, direction, weight, date, and period attributes; the attribute data for tasks includes distribution, basis, inversion and target attributes. Each primitive task or task may selectively have one value among the possible values for each of the respective attributes of the primitive task or task. The attribute values are set for desired primitive tasks or tasks by the user through attribute setting device 4 of FIG. 1A.

The attribute setting device 4 of FIG. 1A is explained with reference to FIG. 1B. The attribute setting device 4 is shown in the form of a hardware unit in FIG. 1B. It may be so arranged, practically, or may be realized with software as explained later with reference to FIG. 18.

Figure 1B:
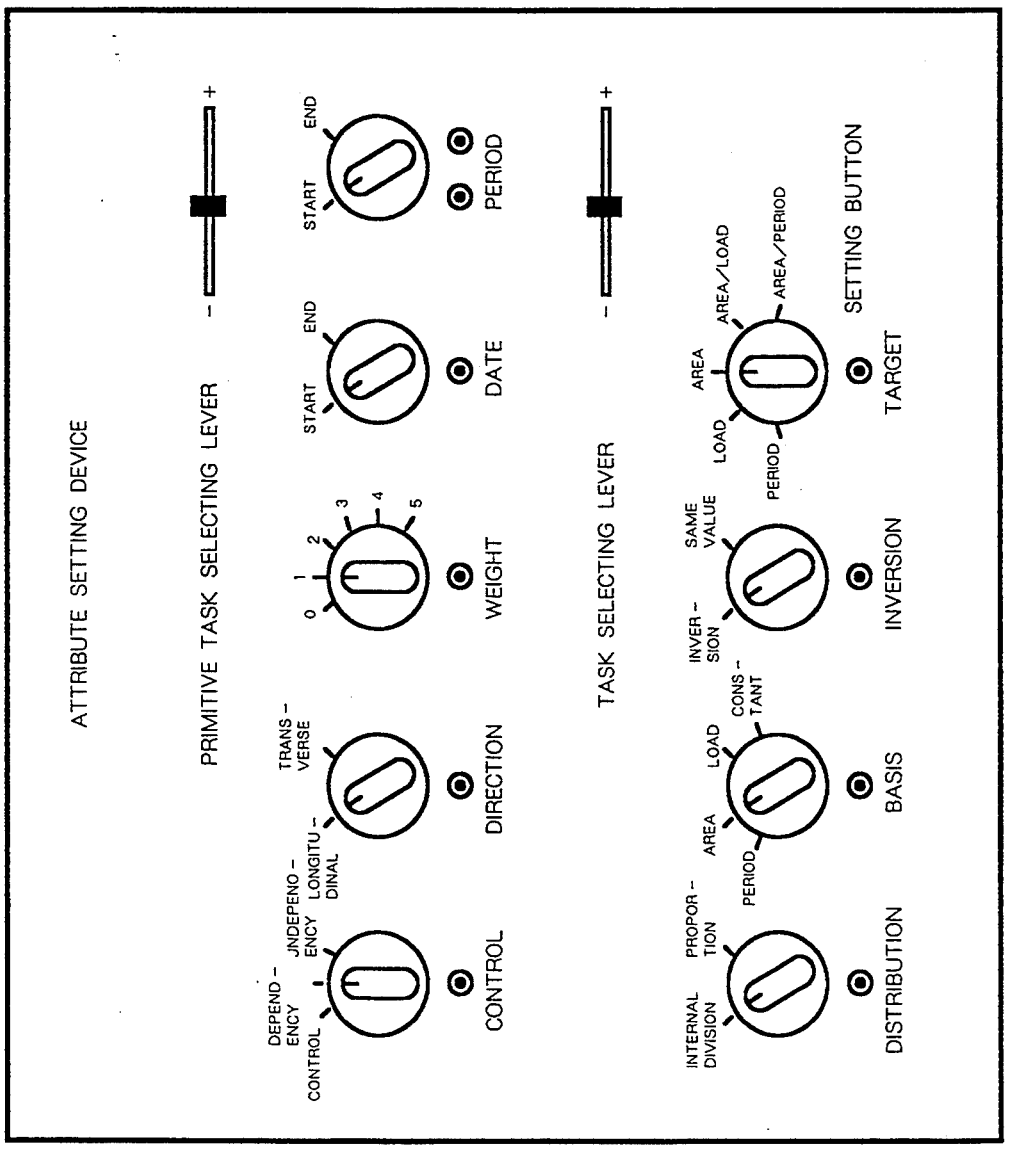
FIG. 1B is a diagram to explain the attribute setting device 4 of FIG. 1A.

In FIG. 1B, the rotary switches on the attribute setting device are attribute switches which are used to select values for respective attributes. The round symbols shown below each attribute switch represent setting buttons which are pressed for setting the values selected by the attribute switches for a primitive task or a task. The attribute names of the attribute switches are identified below the setting buttons. The possible values for each attribute are fixed and are written as selectable attribute values around each attribute switch. The primitive task selecting lever and the task selecting lever can be moved to the right and left to select a specific primitive task or task for which the attribute data will be set.

The attribute data for primitive tasks and tasks are explained below in sequence.

Control Attribute

The control attribute for a primitive task may selectively represent one of the three values of "control", "dependency" and "independency". A primitive task whose attribute value is set to "control" is a primitive task which plays a leading role in modification of the plan. The primitive task having a "control" attribute value is modified according to a modification target position and a shifting amount entered through the modification entry device 5. A primitive task whose control attribute value is set to "dependency" is affected by modification of a primitive task with the "control" attribute value. A primitive task whose "control" attribute value is set to "independency" does not undergo modification of its plan. However, its production starting time and production termination time can be changed (production period length is not changed). Hereinbelow, a primitive task whose "control" attribute value is "control" is called a control primitive task, and a primitive task whose "control" attribute value is "dependency" is called a dependency primitive task.

Figure 5:
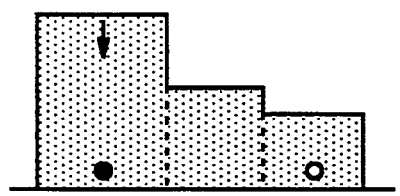
FIGS. 5, 6, 7 and 8 are diagrams that illustrates application of a control attribute.
Figure 6:
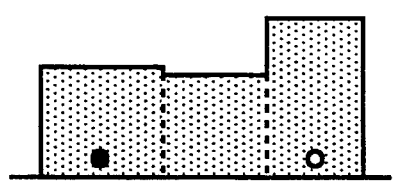
Figure 7:
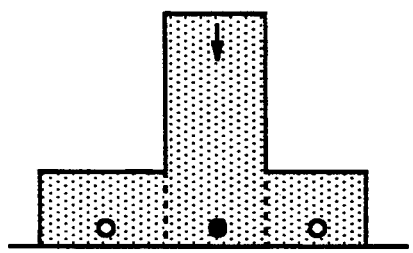
Figure 8:
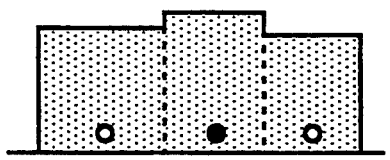

Differences among operations of primitive tasks caused by different selected values of the control attribute are explained by referring to FIGS. 5–8. In FIG. 5, the small, filled-in circle in the leftmost rectangle indicates that it is a control primitive task; the small unfilled circle in the rightmost rectangle indicates that it is a dependency primitive task. The central rectangle represents an independent primitive-task. With control attribute values of "control" for the left primitive task, "independency" for the central primitive task and "dependency" for the right primitive task, respectively, FIG. 6 shows the result of moving the upper edge of the left primitive task downward. Here it is assumed that the example satisfies constraints for maintaining a constant total value of the production quantities of the three primitive tasks and for changing the outer shape of a primitive task having a "dependency" control attribute value in a longitudinal (vertical) direction. FIG. 7 shows that a "control" attribute value is set for the central primitive task while a "dependency" attribute value is set for the left and right primitive tasks. FIG. 8 shows the result of moving the upper edge of the central primitive task downward. It is assumed here again that the example satisfies constraints for maintaining a constant total value of the production quantities of the three primitive tasks, and for changing the primitive tasks having a "dependency" control attribute value in a longitudinal direction and equalizing the modification amounts.

Direction Attribute

Figure 9:
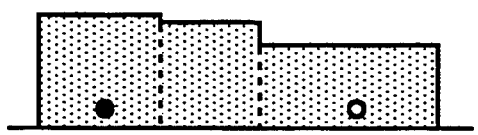
FIG. 9 is a diagram that illustrates application of a direction attribute.

The direction attribute for a primitive task may selectively have one of the two values "longitudinal" and "transverse" as its attribute value. The selected value of this attribute determines whether the outer shape of a primitive task having the control attribute value of "dependency" is changed in a longitudinal (vertical) direction or in transverse (horizontal) direction. The direction attribute is used here, for a primitive task whose target attribute is the area, to select whether the longitudinal edge length or the transverse edge length should be adjusted to increase or decrease the area. FIGS. 5 and 6 show the direction attribute of the right primitive task as being set to "longitudinal". In contrast, FIG. 9 shows a result of the same operation under the same constraints when the direction attribute is set to "transverse".

Weight Attribute

Figure 10:
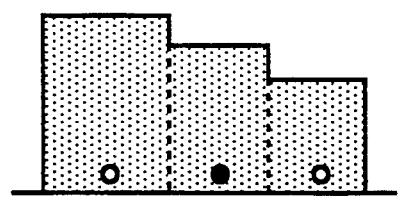
FIG. 10 is a diagram that illustrates application of a weight attribute.

The weight attribute for a primitive task has a positive real number as its attribute value. When specific weighting is desired between modification amounts of primitive tasks having the control attribute value of "dependency", the weight attribute is set to a numerical value corresponding to its attribute value. In FIG. 7, the weight attribute is set to 1 for all primitive tasks. In contrast, FIG. 10 shows a result of the same operation under the same constraints when the weight attribute is set to 3 for the left primitive task and 1 for the right primitive task.

Date Attribute

The date attribute for a primitive task may selectively have either of the two values of "start" and "end" as its attribute value. The date attribute is set only when the production starting date and the production terminal date of a primitive task are desired unchanged. The attribute value of the production starting date is set for a primitive task whose production starting date should be fixed, while the attribute value of the production ending date is set for a primitive task whose production terminal date should be fixed.

Period Attribute

The period attribute for a primitive task may have selectively either of the two values of "start" and "end" as its attribute value. The period attribute is set only when there is a time length difference between the production starting dates or production terminal dates of two primitive tasks. When it is desired to fix the time length difference between the production starting date of a primitive task A and the production terminal date of a primitive task B, the attribute value of the production starting date is set for the primitive task A while the attribute value of the production terminal date is set for the primitive task B. In the period attribute, in addition to these attribute values, a primitive task ID of the partner primitive task and an attribute value indicative of the distinction between the production starting date and the production terminal date of the partner are also stored. In order to set them using the attribute setting device, the primitive task A is selected by the primitive task selecting lever, the attribute switch of the period attribute is set to "start", and the left setting button is pressed. Subsequently, the primitive task B is selected by the primitive task selecting lever, the attribute switch of the period attribute is set to "end", and the right setting button is pressed. As a result, the period attribute is established between the primitive task A and the primitive task B.

Figure 11:
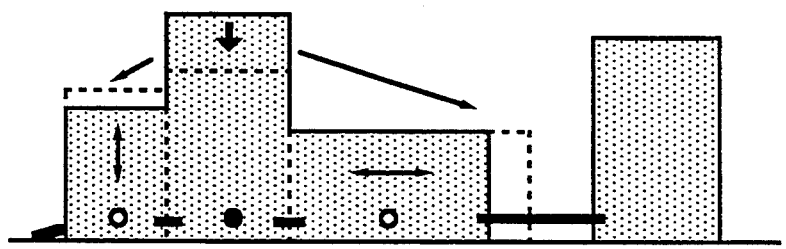
FIGS. 11 and 12 are diagrams that illustrate application of a date attribute and a period attribute.
Figure 12:
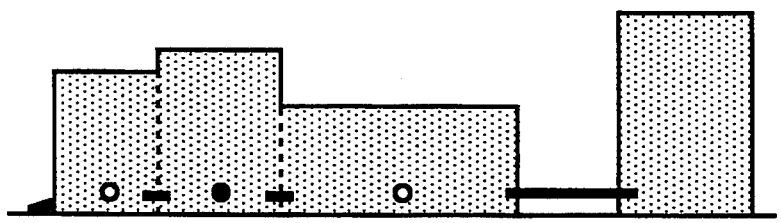

Operations of the date attribute and the period attribute are explained by referring to FIGS. 11-12. In FIG. 11, the wedge-shaped mark indicates that the date attribute and the attribute value of the production starting date is set for the leftmost primitive task. The period attribute is expressed by the transverse bar mark, and the attribute value for the production terminal date and the production starting date are set between adjacent primitive tasks. For example, the attribute value of the production starting date is set for the rightmost primitive task while the attribute value of the production terminal date is set for the adjacent primitive task. Here the upper edge of the next-to-leftmost primitive task in FIG. 11 is moved downward. Under conditions where the direction attribute of the leftmost primitive task is longitudinal, that of the next-to-rightmost primitive task is transversal, the production starting date for the leftmost primitive task is fixed, the distance between adjacent primitive tasks is fixed, and the total value of production quantities of all primitive tasks is constant, then the rightmost primitive task is pushed to the right. This results in the display shown in FIG. 12.

Distribution Attribute Basis Attribute, Inversion Attribute and Target Attribute The distribution attribute, basis attribute, inversion attribute and target attribute of a task are closely related, and establish relationships among a plurality of primitive tasks having attribute values of "control" and "dependency" for their control attributes. More specifically, for a target set by the value of the target attribute, the modification amount for a control primitive task is calculated, and, based on a distribution method set by the value of the distribution attribute and using the target set by the value of the basis attribute as the distribution rate, the modification amount is distributed to other dependency primitive tasks.

Target Attribute

Figure 13:
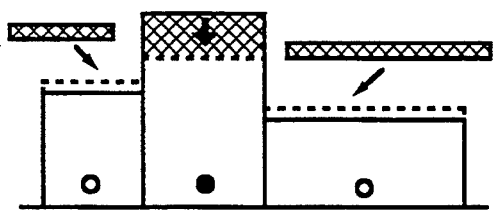
FIG. 13 is a diagram that illustrates application of a target attribute.

The target attribute for a task may have selectively one of the five values "period", "load", "area", "area/load", and "area/period". When the shifting amount from the modification entry device 5 is taken as the modification amount for the period and when this value is employed as a distribution target for a dependency primitive task, the attribute value is set to "period". This also applies to the case of "load" (value corresponding to the day-by-day production quantity of a primitive task) and "area" (value corresponding to the production quantity of the primitive task). When two values, i.e., the value obtained by taking the shifting amount from the entry device as the modification amount of the area and the value obtained by taking the same as the modification amount of the period, are employed as distribution targets for the dependency primitive task, the attribute value is set to "area/period". This also applies to the case of "area/load". In FIG. 13, the modification amount of the central control primitive task is translated into the areas which are indicated by the shaded regions above each dependency task. When the modification amount of the area is taken as the distribution target for the dependency primitive task, the value of the target attribute is set to "area".

Basis Attribute

Figure 14:
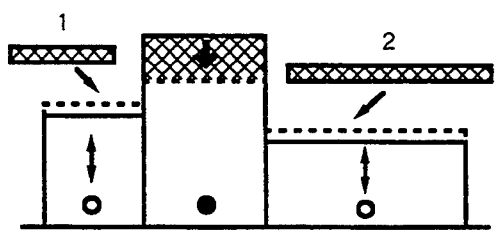
FIG. 14 is a diagram that illustrates application of a basis attribute.
Figure 15:
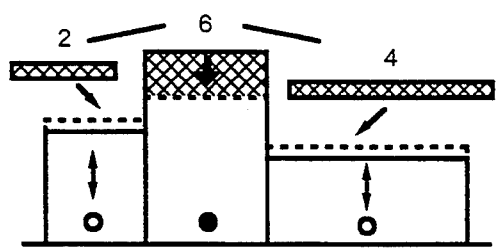
FIG. 15 is a diagram that illustrates application of a distribution attribute.

The basis attribute for a task may have selectively one of the four values "period", "area", "load" and "constant" as its attribute value. When a plurality of dependency primitive tasks are present, it is necessary to decide the rate at which the modification amount is distributed from a controlled primitive task to respective dependency primitive tasks, and to set this as the value of the basis attribute (representative value forming the primitive task). When the attribute value is "period", "area" or "load", the modification amount is distributed to the dependency primitive tasks, based on the ratio between values indicated by the attribute values of the respective primitive tasks. When the attribute value is "constant", the modification amount is equally distributed to all dependency primitive tasks. In FIG. 14, there are two dependency primitive tasks, i.e., both the left primitive task and the right primitive task. Since the attribute value in FIG. 14 is set to "period", the distribution ratio of the modification amount to both dependency primitive tasks is 1:2, taking the values of the period of the respective primitive tasks as a reference of the ratio. In other words, the modification amount 6 in the control primitive task is divided into 2 and 4, i.e., the ratio of 1:2, and these values are distributed to the respective dependency primitive tasks as shown in FIG. 15.

Distribution Attribute

The distribution attribute for a task may have selectively either of the two values "internal division" and "proportion". When the modification amount is distributed by equalizing the modification amount of a control primitive task to the absolute value of the sum of the distributed modification amounts of the dependency primitive tasks, the attribute value is set to "internal division". In this case, the modification amount for the control primitive task is equal to the distributed modification amounts of all dependency primitive tasks. When the modification amount of the control primitive task is distributed in accordance with the attribute value of the basis attribute, without distinguishing the control primitive task from dependent primitive tasks, the attribute value is set to "proportion". In FIG. 15, the attribute value is set to "internal division". Therefore, the modification amount 6 of the area distributed to all dependency primitive tasks is equal to the modification amount 6 of the area of the control primitive task.

Inversion Attribute

Figure 16:
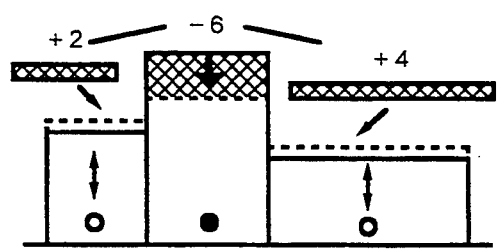
FIG. 16 is a diagram that illustrates application of an inversion attribute.

The inversion attribute for a task may have selectively either of the two values "inversion" and "same value". In order that the code of the modification amount in the control primitive task and the code of the modification amount distributed to the dependency primitive tasks be inverted, the attribute value is set to "inversion". When they should not be inverted, the attribute value is set to "same value". In FIG. 16, since the attribute is set to "inversion", the code of the modification amount of the area in the control primitive task is inverted from the code of the modification amount distributed to the dependency primitive tasks.

FIG. 17 shows a list of attributes and attribute data values for both primitive tasks and tasks.

Note that the attribute setting device 4 of FIG. 1A is practically realized in software using a data entry window shown in FIG. 18. The user can select any attribute value by click operation onto circled radio buttons through a mouse device, in lieu of manipulation of attribute switches.

The attribute data shown here is set individually using the window. However, a plurality of attributes for a plurality of primitive tasks or tasks can be set by a single manipulation to decrease a large amount of the effort required for setting attributes (macro function). In particular, it is useful to bind, as a single manipulation, formal modification patterns often utilized during manipulation. Two examples thereof are a fusible-deformation macro (vertical deformation manipulation as shown in FIGS. 5 and 6) and an elastic-deformation macro (deformation manipulation which urges the position of the production starting date of the left primitive task in FIG. 5 to the right while fixing the position of production terminal date of the right primitive task as if flattening the entire task from the transverse direction).

D. Modification Entry Device

Figure 19:
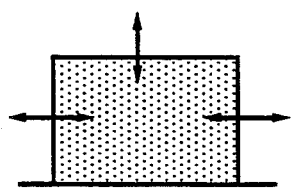
FIG. 19 is a diagram showing a modification target location of a control primitive task.

The modification entry device 5 transmits modification target positions and the shifting amount of a control primitive task to the modification amount diffusion device 6. As shown in FIG. 19, three modifiable positions, i.e., the right and left vertical edges and the upper horizontal edge of the rectangle indicative of the primitive task, are set selectively as modification target positions of a control primitive task. The shifting amount is indicated by a numerical value of the positional difference from the position prior to the modification at the modification position (a horizontal difference for a shifting amount of a vertical edge and a vertical difference for a shifting amount of a horizontal edge). Typically, these values may be indicated in an interactive manner using a mouse device (modification entry device 5) which is one of several alternative pointing devices. In this case, operability can be improved by mouse operation while looking at the plan in the form of a graphical representation on the display device 8. However, a joystick, a touch panel or the like may be employed in lieu of the mouse device, and there is no need for limiting such entry means to the mouse device. Further, the modification target position or the modification amount may be entered from a file or the like through a batch transaction.

E. Modification Amount Diffusion Device

The modification amount diffusion device 6 calculates the modification amount for a control primitive task and a dependency primitive task from the data entered through modification entry device 5 and the model data stored on the model data storage device 3, and then stores the result as primitive task data on the storage device 3. Calculation of the modification amount is executed through a series of four calculation steps: a target modification amount calculation, a modification amount distribution calculation, a shape calculation and a location calculation.

Target Modification Amount Calculation

This step calculates the modification amount by treating the shifting amount from the modification entry device 5 as the attribute value of the target attribute. For instance, when the target modification position of a control primitive task is the upper edge of a rectangle, with its shifting amount being 10, the width being 20 and the target attribute being the area, the target modification amount calculation is executed by regarding the shifting amount 10 as the value of the area, and 200 which is obtained by multiplying the shifting amount 10 by the width 20 as the modification amount.

Modification Amount Distribution Calculation

Figure 20:
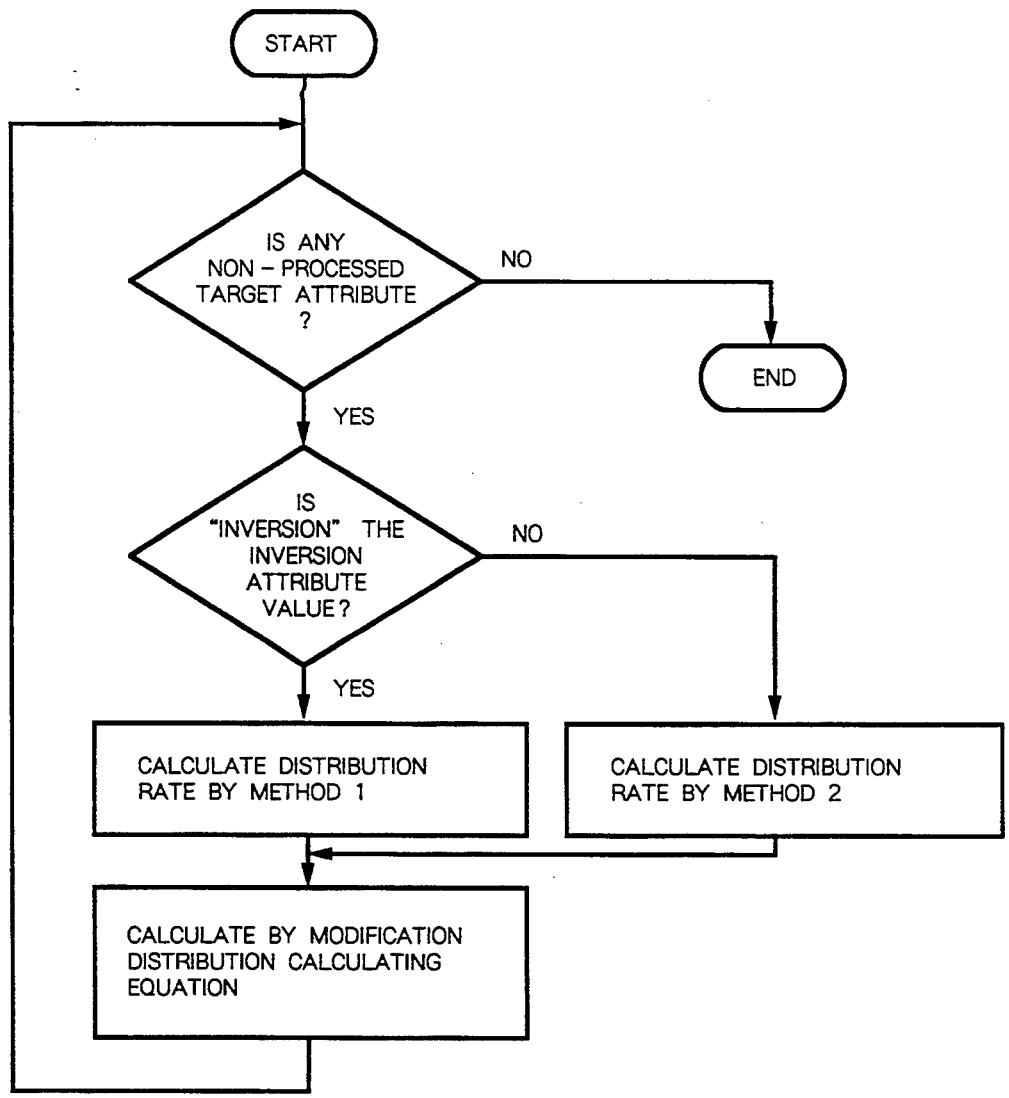
FIG. 20 is a diagram showing the distribution algorithm of the present invention.

This step distributes the modification amount obtained from the target modification amount calculation to all dependency primitive tasks according to the distribution algorithm depicted in FIG. 20 as well as the following equation where variables accompanied by represent modification amounts of control primitive tasks or dependency primitive tasks. Note that the distribution algorithm is not referred to in detail here because FIG. 20 fully describes the algorithm.

Δperiod i = Δperiod c × distribution rate i
(when the target attribute is "period" or "area/period")
Δload i = Δload c × distribution rate i
(when the target attribute is "load" or "area/load")
Δarea i = Δarea c × distribution rate i
(when the target attribute is "area")

where i is a primitive task whose attribute is "control" or "dependency", and c is a primitive task whose attribute is "control", and where the distribution rate for primitive task i is the value calculated by one of the following equations. When the distribution attribute is "internal division":

Method 1 (where the inversion attribute is "inversion"):
distribution rate $i$ (dependency primitive task) =

$$\frac{\overline{\text{basis attribute value } i} \times \text{weight attribute value } i}{\Sigma \text{ basis attribute value } i \times \text{weight attribute value } i}$$

($i$ = dependency)

Method 2 (where the inversion attribute is "same value"):
distribution rate $i$ (dependency primitive task) =

$$\frac{\text{basis attribute value } i \times \text{weight attribute value } i}{\Sigma \text{ basis attribute value } i \times \text{weight attribute value } i}$$

($i$ = dependency)

When the distribution rate is "proportional":

Method 1 (where the inversion attribute is "inversion"):
distribution rate $i$ (dependency primitive task) =

$$\frac{\overline{\text{basis attribute value } i} \times \text{weight attribute value } i}{\text{basis attribute value } c \times \text{weight attribute value } c}$$

Method 2 (where the inversion attribute is "same value"):
distribution rate $i$ (dependency primitive task) =

$$\frac{\text{basis attribute value } i \times \text{weight attribute value } i}{\text{basis attribute value } c \times \text{weight attribute value } c}$$

Note that when i represents a control primitive task, the distribution rate i = 1.

Shape Calculation

This step calculates the width (period) or the height (load) of a rectangle after modification from the modification amount distributed to respective primitive tasks in the modification amount distribution calculation step, according to the following equation.

$$\Delta\text{load } i = \frac{\frac{\text{original area } i}{\text{original period } i} + \Delta\text{area } i}{\frac{\text{original area } i}{\text{original period } i} + \Delta\text{period } i} - \text{original load } i$$

(where the target attribute is "period", "area/period" or "area" and the direction attribute is longitudinal".)

$$\Delta\text{period } i = \frac{\frac{\text{original area } i}{\text{original load } i} + \Delta\text{area } i}{\frac{\text{original area } i}{\text{original load } i} + \Delta\text{load } i} - \text{original period } i$$

(where the target attribute is "load", "area/load" or "area", and the direction attribute is "transverse".)

Figure 21:
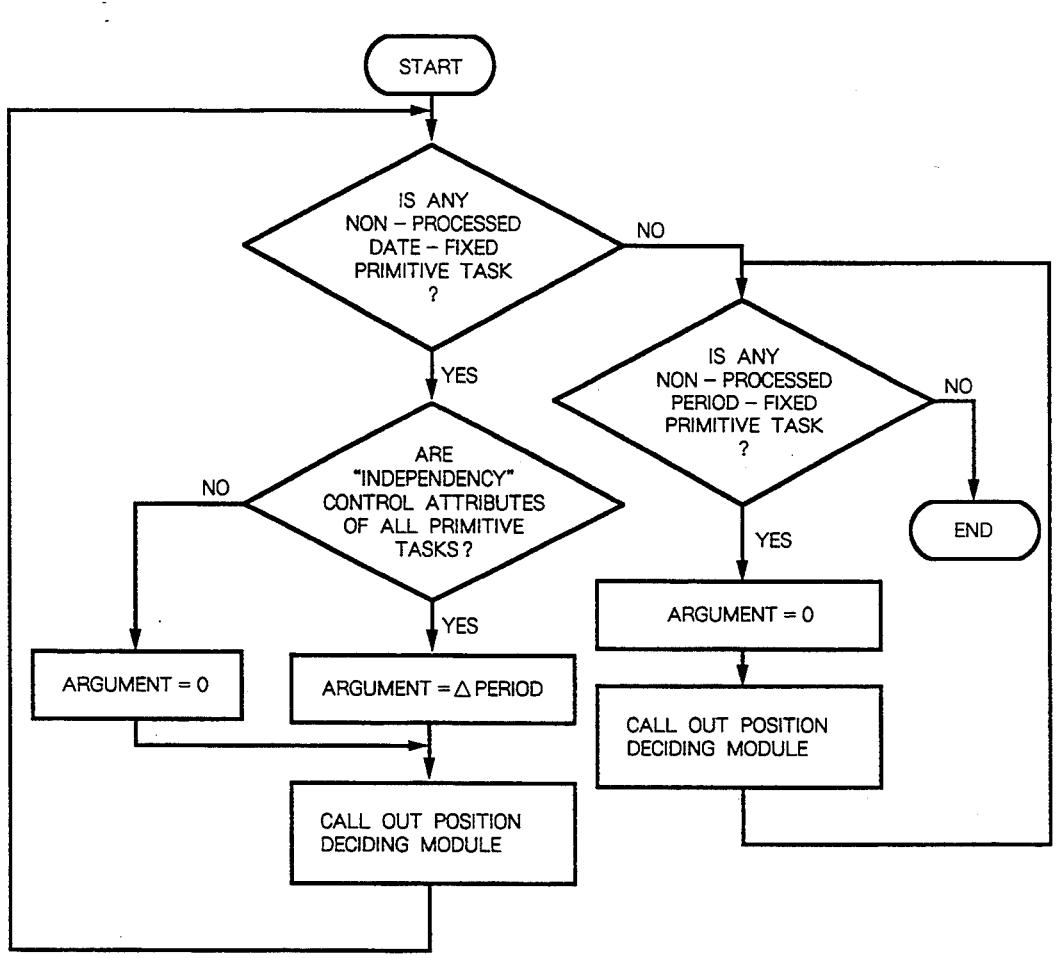
FIG. 21 is a diagram showing the location calculating algorithm of the present invention.
Figure 22:
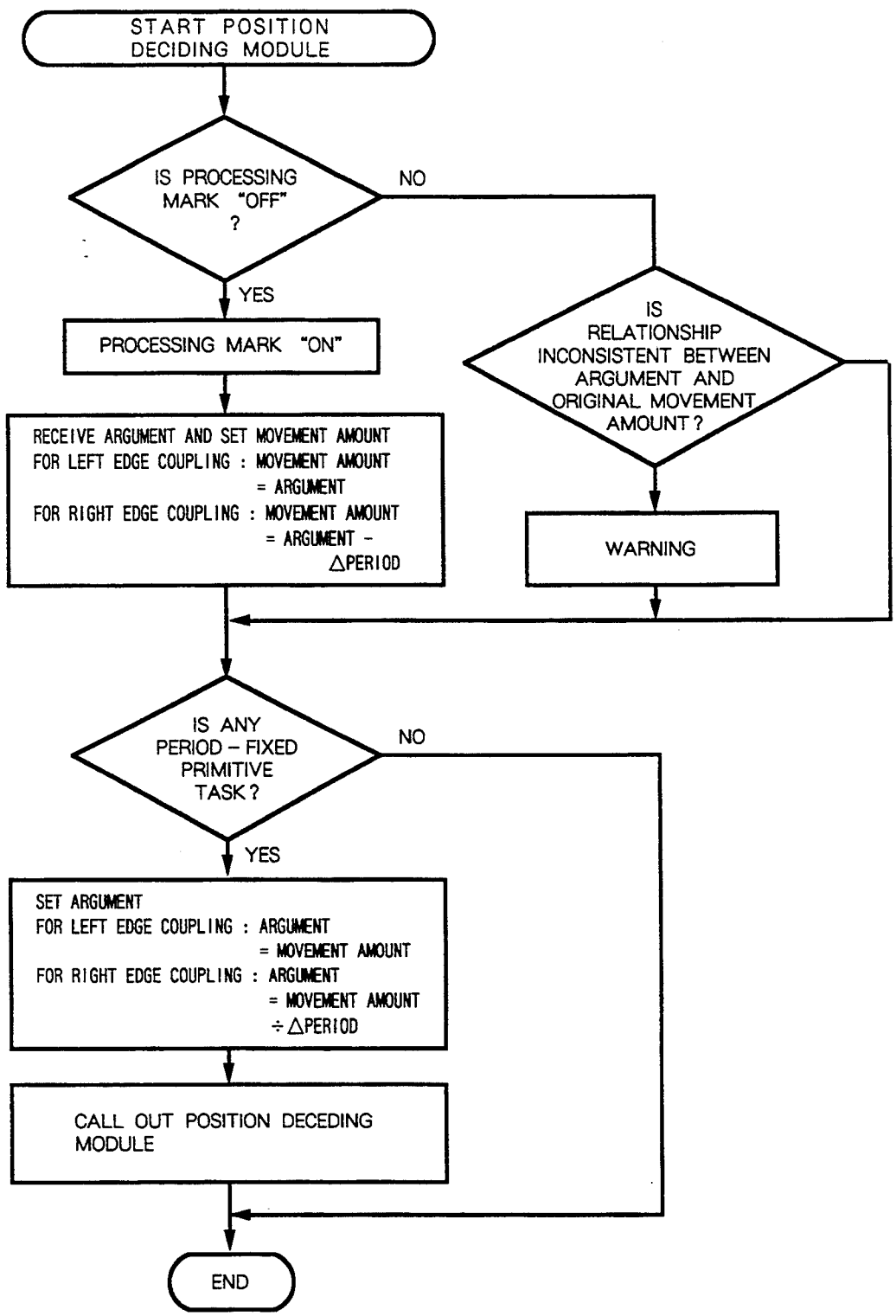
FIG. 22 is a diagram showing a position deciding algorithm of the present invention; and, FIGS. 23, 24 and 25 are diagrams showing progressively an example of a process for load-balancing a production plan including two tasks.

The shape of the primitive task after modification is calculated by the following equation.
new load i = original load i + Δload i
new period i = original period i + Δperiod i Location Calculation Step This step calculates a positional deviation from the position prior to modification of the production starting date of each primitive task, according to the location calculating algorithm of FIGS. 21 and 22. The location calculating algorithm is briefly explained below. A processing mark variable (initial value is "OFF") is set for each primitive task, and each primitive task whose location calculation has been don has its processing mark variable set to "On". If there is any primitive task whose processing mark variable is "OFF" and whose attribute value for the period attribute is set to "start" or "end", an argument is set, and a position deciding module is called. In the position deciding module, the processing mark variable is set to "On" for a primitive task which has not been processed yet, and any moved amount of the primitive task is calculated from the argument and the changed amount of the period. On the other hand, for a primitive task that has been processed, the algorithm investigates whether the already-calculated moved amount is inconsistent and, if any inconsistency is found, a message is shown on the screen to invite a user to cope with it. In this case, it means that the shifting amount from the entry device and the attribute data are inconsistent. If the period attribute is set from one primitive task to another primitive task (in FIG. 22, the terms "left edge coupling" means the period attribute is set between the production starting date of the primitive task and another primitive task, and the terms "right edge coupling" means the same as the left edge coupling except the production starting date is replaced by the production terminal date), an argument value is calculated, and the position deciding module is called again. Any primitive task whose processing mark variable is "OFF" upon completion of the algorithm processing indicates that it is a primitive task which has not been positionally deviated from the position prior to the modification. For each primitive task, the value obtained by adding the moved amount to the production starting date before modification becomes a new production starting date. In this case, the production starting date after modification does not always represent an integer; therefore, in order to change it into an integer, additional processing of primitive task data is required to adjust the production starting date.

F. Example of Operation

Figure 23:
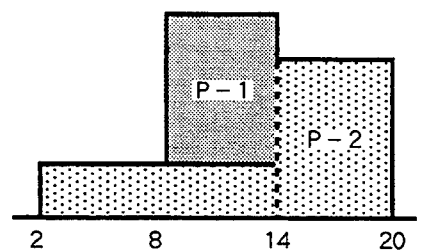

The following example describes application of the present invention to load-balancing. First referring to FIG. 23, entire load-balancing of a task P-1 is achieved by extending the production period without changing the production quantity and the production terminal date. The task P−1 is modified by mouse operation.

Figure 24:
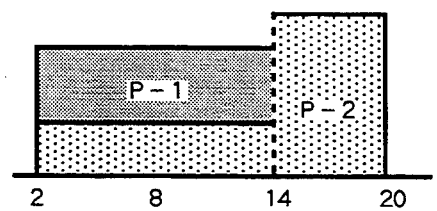
Figure 25:
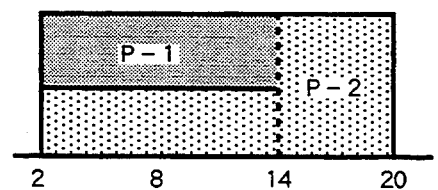

Therefore, the control attribute of the task P—1 is set to "control". In order to maintain the production terminal date of the task P—1 unchanged, the date attribute is set to "terminal date". Since the period of the task P—1 is modified through mouse operation, the target attribute is set to "period". Since the target of modification is a single primitive task, the other attributes can have any desired values. The original period for task c and the distribution rate=1 are obtained from the target modification amount calculation step. A new period for task c is obtained from the equation in the modification amount distribution calculation step. From the shape calculation step is calculated the load c, and the shape after modification is thus obtained. From the location calculation step is obtained a deviation from the original position of the task P—1. As a result of these calculation steps, FIG. 24 is displayed. Subsequently, load-balancing is done by reducing the load from 14the to 20the day without changing the production quantity of the task P—2. The right primitive task of the task P—2 is modified by means of mouse operation. Therefore, the control attribute of the right primitive task is set to "control" while the control attribute of the left primitive task is set to "dependency" in order to make the left primitive task dependent upon the modification of the right primitive task. In order that the production quantity of the entire task P—2 be maintained upon modification of the area of the right primitive task of the task P—2, the target attribute is set to "area", the distribution attribute is set to "internal division", and the inversion attribute is set to "inversion". These attributes must be set when the modification amount in a control primitive task is compensated by the other primitive tasks to maintain the total value constant. Since the basis attribute and the weight attribute are used to determine the distribution rate when there are a plurality of primitive tasks for distribution of a modification amount, they can have any desired values in this example. The direction attribute value is set to "longitudinal" because modification of the right primitive task is adjusted by the height of the load of the left primitive task. By means of mouse operation, the upper edge is pointed to as the target modified position, and the shifting amount is given a numerical value. As a result of the four calculation steps performed by the modification amount diffusion device 6, the shape and the location of the task P—2 are modified and results in the display of FIG. 25.

The foregoing description produces model data based on production plan information managed by the table calculator 1; however, modification of the production plan can be effected by directly entering the model data, without using the table calculator.

While the invention has been particularly shown and described with reference to the preferred embodiment thereof, it will be understood by those skilled in the art that various changes in form and details may be made therein without departing from the spirit and scope of the invention.

I claim:

1. A method for an interactive modification of a production plan for use with a computer system, the production plan comprised of a plurality of product tasks, each product task having two or more associated primitive tasks, with each primitive task having an associated primitive task information, comprising the steps of:

specifying primitive task information for each primitive task, said primitive task information comprised of a time interval and a production quantity;

storing said primitive task information for each of said plurality of product tasks on a storage device;

displaying the production plan on a display device using a graphical representation for each primitive task, wherein the graphical representation for each primitive task is determined using the respective primitive task information and primitive task information of other primitive tasks that have overlapping time intervals, wherein each primitive task is graphically represented by at least one geometric object, and the primitive tasks of each product task are displayed having a common visual characteristic;

establishing a plurality of modification rules for each product task, said rules defining how a change in the primitive task information of each primitive task associated with the product task, changes the primitive task information of other primitive tasks associated with the product task and said modification rules require that a total production quantity obtained by summing the production quantities for all primitive tasks associated with the first product task remain unchanged as a result of applying the modification rules;

storing said plurality of modification rules on a storage device;

modifying said production quantity of said primitive task information associated with a first primitive task where said modification is performed by manipulating the graphical representation of the first primitive task;

modifying said production plan by changing the primitive task information of other primitive tasks based on the modification of the production quantity of said first primitive task and the modification rules of the product task with which the first primitive task is associated; and updating the display device to reflect modifications of the production plan.

2. The method for interactive modification of a production plan according to claim 1 wherein for each product task the primitive task information associated with each primitive task of the product task is also displayed in a table.

3. The method for interactive modification of a production plan according to claim 2 wherein said table is provided by a spreadsheet program.

4. A method as in claim 1 wherein said modification rules require that modification of the production quantity of said first primitive task modify only the time intervals of the primitive tasks associated with the product task of the first primitive task.

5. A method as in claim 1 wherein said modification rules require that modification of the production quantity of said first primitive task modify only the time intervals of the production quantity of primitive tasks associated with the product task of the first primitive task.

6. A method as in claim 1 wherein said modification rules require that modification of the production quantity of said first primitive task modify only the production quantity of primitive tasks associated with the product task of the first primitive task in accordance to a plurality of weights, each weight corresponding to a primitive task associated with the product task of the first primitive task.

7. An apparatus for an interactive modification of a production plan for use with a computer system, comprising:

the production plan having a plurality of product tasks, each product task having [one]two or more associated primitive tasks, with each primitive task having associated primitive task information, said primitive task information comprised of a time interval and a production quantity;

means for inputting primitive task information;

a display device;

means for displaying said production plan on a display device so that a total production for all product tasks is shown as a function of time, said total production shown using a graphical representation for each primitive task, wherein the graphical representation for each primitive task is determined using the respective primitive task information and primitive task information of other primitive tasks that have overlapping time intervals, wherein each primitive task is graphically represented by at least one geometric object where each geometric object having an associated display area and where the total production for each primitive task corresponds to a sum of the display areas of the associated geometric objects and where the geometric objects of each primitive task for each product task when displayed have a common visual characteristic;

means for establishing a plurality of modification rules for each product task, said rules defining how a change in the primitive task information of each primitive task associated with the product task, changes the primitive task information of other primitive tasks associated with the product task and said rules require that a total production quantity obtained by summing the production quantities for all primitive tasks associated with a first product task remain unchanged as a result of applying the rules;

means for modifying said production quantity of said primitive task information associated with a first primitive task, where said modification is performed by manipulating the graphical representation of the first primitive task;

means for modifying said production plan by changing the primitive task information of other primitive task based on the modification of the production quantity of said first primitive task and the modification rules of the product task with which the first primitive task is associated;

update means coupled to the display device to display said modified production plan; and means for storing said primitive task information for primitive tasks in the production plan and for storing said modification rules.

8. The apparatus for the modification of a production plan according to claim 7 including a spread sheet means for inputting and storing said primitive task information for all product tasks in the production plan.

9. The apparatus for the modification of a production plan according to claim 7 wherein said means for establishing said modification rules assigns at least one attribute to each of said primitive tasks associated with the product task.

10. An apparatus as in claim 7 wherein said means for said modification of said first primitive task is a mouse device.

11. A method for an interactive modification of a production plan for use with a computer system, the production plan comprised of a first product task, the first product task having a plurality of primitive tasks, with each primitive task having an associated primitive task information, said primitive task information having a time interval and a production quantity, comprising the steps of:

specifying primitive task information for each primitive task associated with the first product task;

displaying the production plan on a display device using a graphical representation for each primitive task associated with the first product task, wherein the graphical representation for each primitive task is a rectangle having a height and a width, where the height of the rectangle corresponds to the respective production quantity and the width corresponds to the respective time interval;

establishing a plurality of modification rules for the production plan, said modification rules defining how a change in the primitive task information of each primitive task associated with the first product task changes the primitive task information of other primitive tasks associated with the first product task and said modification rules require that a total production quantity obtained by summing the production quantities for all primitive tasks associated with the first product task remain unchanged as a result of applying the modification rules;

modifying said production quantity of said primitive task information associated with a first primitive task associated with the first product task where said modification is performed by changing the height of the rectangle corresponding to the first primitive task;

modifying said production plan by modifying the primitive task information of the other primitive tasks associated with the first product task based on the modification of the production quantity of said first primitive task and the modification rules of the first product task;

updating the display device to show the modified production plan; and storing said primitive task information and said plurality of modification rules for the first product task on a storage device.

12. The method of claim 11 wherein said production further comprises a second product task having at least one primitive task.

13. A method as in claim 11 wherein said modification rules require that modification of the production quantity of said first primitive task modify only the time intervals of the other primitive tasks associated with the first product task.

14. A method as in claim 11 wherein said modification rules require that modification of the production quantity of said first primitive task modify only the time intervals of the other primitive tasks associated with the first product task.

15. A method as in claim 11 wherein said modification rules require that modification of the production quantity of said first primitive task modify only the production quantity of the other primitive tasks associated with the first product task in accordance to a plurality of weights, each weight associated with one of the other primitive tasks associated with the first product task.

* * * * *